US011183217B1

(12) United States Patent
Liu et al.

(10) Patent No.: US 11,183,217 B1
(45) Date of Patent: Nov. 23, 2021

(54) ELEVATOR DRIVE WITH INCREASED RELIABILITY

(71) Applicant: Seagate Technology LLC, Fremont, CA (US)

(72) Inventors: Xiong Liu, Singapore (SG); Lihong Zhang, Singapore (SG)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/204,288

(22) Filed: Mar. 17, 2021

(51) Int. Cl.
| | |
|---|---|
| *G11B 5/09* | (2006.01) |
| *G11B 11/24* | (2006.01) |
| *G11B 5/48* | (2006.01) |
| *G11B 5/455* | (2006.01) |
| *G11B 5/40* | (2006.01) |
| *G11B 5/00* | (2006.01) |

(52) U.S. Cl.
CPC ............... *G11B 11/24* (2013.01); *G11B 5/40* (2013.01); *G11B 5/455* (2013.01); *G11B 5/4813* (2013.01); *G11B 5/4826* (2013.01); *G11B 5/4833* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,243,350 B1* | 6/2001 | Knight | G11B 23/0316 |
| | | | 369/126 |
| 8,107,326 B1* | 1/2012 | Hirano | G11B 5/6088 |
| | | | 369/13.33 |
| 8,254,212 B2 | 8/2012 | Snyder | |
| 8,902,547 B1 | 12/2014 | Zhong | |
| 9,704,519 B1 | 7/2017 | Zhu et al. | |
| 9,947,353 B1* | 4/2018 | Zhang | G11B 5/6076 |
| 10,147,454 B1 | 12/2018 | Mendonsa et al. | |
| 10,269,380 B1 | 4/2019 | Sun et al. | |
| 10,325,619 B2 | 6/2019 | Wiesen et al. | |
| 10,699,730 B1* | 6/2020 | Uefune | G11B 5/012 |
| 2002/0001283 A1* | 1/2002 | Niwa | G11B 7/0937 |
| | | | 369/112.27 |
| 2010/0061200 A1* | 3/2010 | Shimazawa | G11B 5/314 |
| | | | 369/13.33 |
| 2010/0110590 A1* | 5/2010 | Ohsawa | G11B 5/484 |
| | | | 360/234.5 |
| 2010/0118664 A1* | 5/2010 | Nishida | G11B 9/1409 |
| | | | 369/13.33 |
| 2011/0164333 A1* | 7/2011 | Sasaki | G11B 5/6088 |
| | | | 360/59 |
| 2014/0104996 A1* | 4/2014 | Tsuchiyama | G11B 13/08 |
| | | | 369/13.17 |
| 2015/0043315 A1 | 2/2015 | Chen et al. | |
| 2018/0122407 A1 | 5/2018 | Vossough et al. | |
| 2018/0350397 A1* | 12/2018 | Matsumoto | G11B 11/08 |

\* cited by examiner

*Primary Examiner* — Peter Vincent Agustin
(74) *Attorney, Agent, or Firm* — Westman, Champlin & Koehler, P.A.

(57) ABSTRACT

A recording system for a heat assisted magnetic recording hard disc drive (HDD) includes a head suspension pair including a first head/slider facing a first direction, and a second head/slider facing an opposite direction from the first head/slider. A number of near field transducers (NFTs) are disposed on each of the first head/slider and the second head/slider.

20 Claims, 4 Drawing Sheets

US 11,183,217 B1

ELEVATOR DRIVE WITH INCREASED RELIABILITY

SUMMARY

In one embodiment, a recording system for a heat assisted magnetic recording hard disc drive (HDD) includes a head suspension pair including a first head/slider facing a first direction, and a second head/slider facing an opposite direction from the first head/slider. A number of near field transducers (NFTs) are disposed on each of the first head/slider and the second head/slider.

In another embodiment, a data storage device includes a number of heat assisted magnetic recording (HAMR) data storage media, a head stack assembly (HSA) including HAMR heads for reading data from and/or writing data to the data storage media, and an elevator system for moving the HSA to engage the data storage media. Each HSA includes a head suspension pair including a first head/slider facing a first direction, and a second head/slider facing an opposite direction from the first head/slider to engage top and bottom surfaces of data storage media. A plurality of near field transducers (NFTs) are disposed on each of the first head/slider and the second head/slider.

In yet another embodiment, a method of operating a data storage device having heads for heat assisted magnetic recording includes operating a first near field transducer (NFT) of a plurality of NFTs on each of a plurality of sliders for reading and/or writing data to the data storage device, and operating a second NFT of the plurality of NFTs on an individual slider of the plurality of sliders when a criterion for no longer using the first NFT is met.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally provide a head-suspension pair in an elevator drive, having a head/slider for each of the head-suspension pair. Each head/slider has multiple near field transducers (NFTs). In one embodiment, two or three NFTs are used for each head/slider. Since HAMR elevator drives may have only one head/slider pair, additional costs due to the addition of NFTs is only applied to the one head/slider pair as opposed to additional heads of, for example, a traditional ten disc hard disc drive (HDD). The multiple NFTs allow for an increased write power-on hours (wPOH) figure for the HAMR elevator drives without reliability issues. The multiple NFTs work with multiple writers, and can share a submount, or have their own submount. The multiple NFTs also are amenable to use with laser in slider (LIS) configurations.

In current HDDs, a number of heads is equal to a number of disc surfaces, and the heads are rotated for positioning over their corresponding disc surfaces to carry out read/write operations. There is no up/down movement of the heads in such HDDs. However, in an "elevator" drive, the number of heads employed is less than the number of disc surfaces, and a head stack assembly (HSA) including the fewer number of heads is moved up/down to enable a same head to read from multiple disc surfaces.

With the advent of elevator drives that may have only one head/suspension pair for top and bottom disc surfaces, and the increased data density of heat assisted magnetic recording (HAMR) devices, reliability issues such as degradation of near field transducers (NFTs) and because of that decreased drive life have become more prevalent. For example, in an elevator drive, the workload of each head can be ten times higher than a normal head for a ten disc HDD. Because of this, the expected lifetime of NFTs in use on the elevator drives should be increased by ten times to accommodate the increased workload. Current NFT and HAMR technology does not allow this.

Prior to providing a detailed description of the different embodiments, one example of an elevator drive is described below in connection with FIG. 1.

Figure 1:
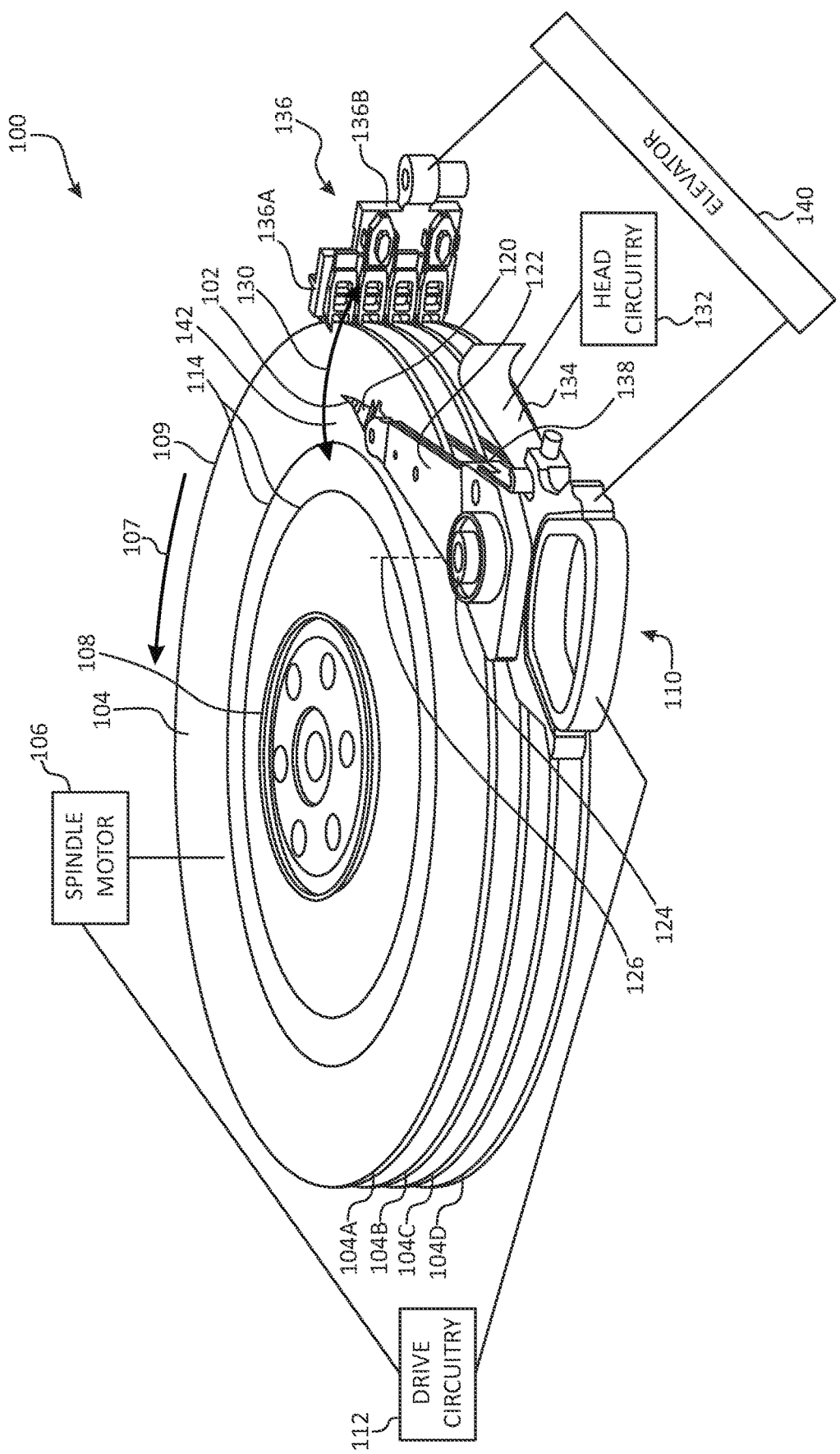
FIG. 1 is a schematic illustration of an elevator type data storage device on which embodiments of the present disclosure may be practiced.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment, such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including data storage media, a head stack assembly (HSA) including heads for reading data from and/or writing data to the data storage media, a split ramp for supporting the heads, and an elevator for moving the HSA and a portion of the split ramp in accordance with one embodiment. In data storage device 100, heads 102 may be positioned over storage media 104 to read data from and/or write data to the data storage media 104. In the embodiment shown in FIG. 1, the data storage media 104 are rotatable data storage discs, with each disc 104 having opposing surfaces that serve as data storage surfaces. For read and write operations, a spindle motor 106 (illustrated schematically) rotates the media 104 as illustrated by arrow 107 and an actuator mechanism 110 positions the heads 102 relative to data tracks 114 on the rotating media 104 between an inner diameter (ID) 108 and an outer diameter (OD) 109. Both the spindle motor 106 and actuator mechanism 110 are connected to and operated through drive circuitry 112 (schematically shown). Each of heads 102 is coupled to the actuator mechanism 110 through a suspension assembly which includes a load beam 120 connected to an actuator arm 122 of the mechanism 110, for example, through a swage connection. The actuator mechanism 110 is rotationally coupled to a frame or deck (not shown) through a bearing 124 to rotate about axis or shaft 126. Rotation of the actuator mechanism 110 moves the heads 102 in a cross-track direction as illustrated by arrow 130. Each of the heads 102 includes one or more transducer elements (not shown) coupled to head circuitry 132 through flex circuit 134.

In general, in order to keep read/write heads 102 from landing on discs 104 in data storage device 100 when, for example, power is removed from the data storage device 100, and to prevent the heads 102 from colliding with outer edges of the discs 104 during load and unload operations, a head-support ramp 136 is provided adjacent to the OD 109 of the discs 104. In data storage device 100, a number of heads 102 is less than a number of disc 104 surfaces. In the particular embodiment shown in FIG. 1, data storage device 100 includes four discs, with a total of eight data storage surfaces, and four heads 102. As noted above, each of the four heads 102 is coupled to the actuator mechanism 110 through a suspension assembly which includes a load beam 120 connected to an actuator arm 122. The load beams 120 and the actuator aims 122 are collectively referred to as the HSA, which can include one or more heads 102.

In data storage device 100 of FIG. 1, the HSA, which is denoted by reference numeral 138, may be moved along axis 126 between an upper position and a lower position with the help of an elevator 140, which is schematically shown in FIG. 1. In the upper position shown in FIG. 1, the four heads interact with data storage surfaces of discs 104A and 104B. In the lower position (not shown), the same four heads interact with data storage surfaces of discs 104C and 104D.

In order to enable the up/down movement of the HSA 138, head-support ramp 136 is designed as a split ramp with a stationary portion 136A and moveable portion 136B. In order to move the HSA 138 from either the upper position to the lower position or from the lower position to the upper position, the HSA 138 is first rotated about axis 126 until a head end 142 of the HSA 138 is supported on the moveable portion 136B of the head-support ramp 136. Then, the HSA 138 and the moveable portion 136B are moved up/down in unison by the elevator 140. It should be noted that, in some embodiments, ramp 136 may be a single unit that can be retracted away from the discs 104 to enable up/down movement of the HSA 138 and the entire ramp 136 by the elevator 140.

In data storage devices, such as 100, heat assisted magnetic recording may be employed. Heat assisted magnetic recording (HAMR) is a technology that increases the amount of data that can be stored on a HDD. HAMR uses technology on each disk that allows data bits, or grains, to become smaller and more densely packed than ever, while remaining magnetically stable. A small laser diode attached to each recording head heats a tiny spot on the disk, which enables the recording head to flip the magnetic polarity of each very stable bit, enabling data to be written.

A plasmonic metal antenna, also called a near-field transducer (NFT), is used in HAMR to help focus the energy from a diode laser into a very small volume much beyond the diffraction limit of light, into the recording medium and subsequently, heating up the medium locally. Increasing the recording medium temperature close to the Curie temperature decreases the coercivity of the medium and the magnetic switching field of the medium reduces. Thus, it is possible to orient the bits in the required orientation with the external magnetic field during the write cycle.

Self-heating of NFTs over repeated cycles can lead to NFT material failure, which in turn leads to degradation of the hard disk drive performance. The degradation of NFTs is a factor in HAMR drive failure. In a typical HAMR configuration, each head has its own NFT. NFT lifetime is reported in Write Power-On Hours (wPOH) which has large variations.

Embodiments of the present disclosure use two or more NFTs per slider in an elevator drive having a single pair of heads such as described above. The use of two or more NFTs for the pair of heads in an elevator HDD allows for a large increase in the life of the HDD. It should be understood that multiple different types of elevator drives are amenable to use with embodiments of the present disclosure without departing from the scope thereof.

HAMR based elevator drives are able to aggressively reduce HAMR costs by reducing the number of heads/suspensions in the HDD to only one head-suspension pair (for top and bottom surfaces) with two channel-preamplifiers in a HDD under an elevator architecture such as is shown above in FIG. 1. This one pair of heads/suspensions work with two-channel preamplifiers to write to and read from all media surfaces of the HDD. As has been discussed, since elevator drives have fewer heads, those heads have a greater workload. This reduces the life span of the HDD because of the degradation of the NFT.

One reliability issue is due to the workload multiplication of the heads. Embodiments of the present disclosure address this issue by using multiple NFTs on an elevator drive (e.g., two or three NFTs). The use of multiple NFTs improves the wPOH and lifespan of elevator type HDDs. With the reduction of the number of heads, the number of traces used on a printed circuit cable (PCC) is reduced and, therefore, enough space is available in the PCC for the additional traces for multiple NFTs for the additional pads due to multiple NFTs and writers. Additionally, the embodiments of the present disclosure do not generate significant cost increases, because the additional NFTs are added to only two sliders. Further, by reducing the number of heads, suspensions and the number of channels in the preamplifiers, which are the most expensive components, an elevator drive reduces the cost of HDDs. The cost reduction is more significant for HAMR HDDs since they use only two head/sliders.

The multi-NFTs working with multi-writers can share the same submount. Since the lasers and writers are parallel to each other and in a similar plane, they can all be fabricated using the same manufacturing process steps. During operation, the NFT-writer pairs work separately. However, they can be switched, which is similar to the current head-switching in conventional HAMR drives. For a dual NFT design, the estimated wPOH gain based on the current drive-level wPOH data is 10× to 60×. For three NFTs, the wPOH gain will be even larger.

Figure 2:
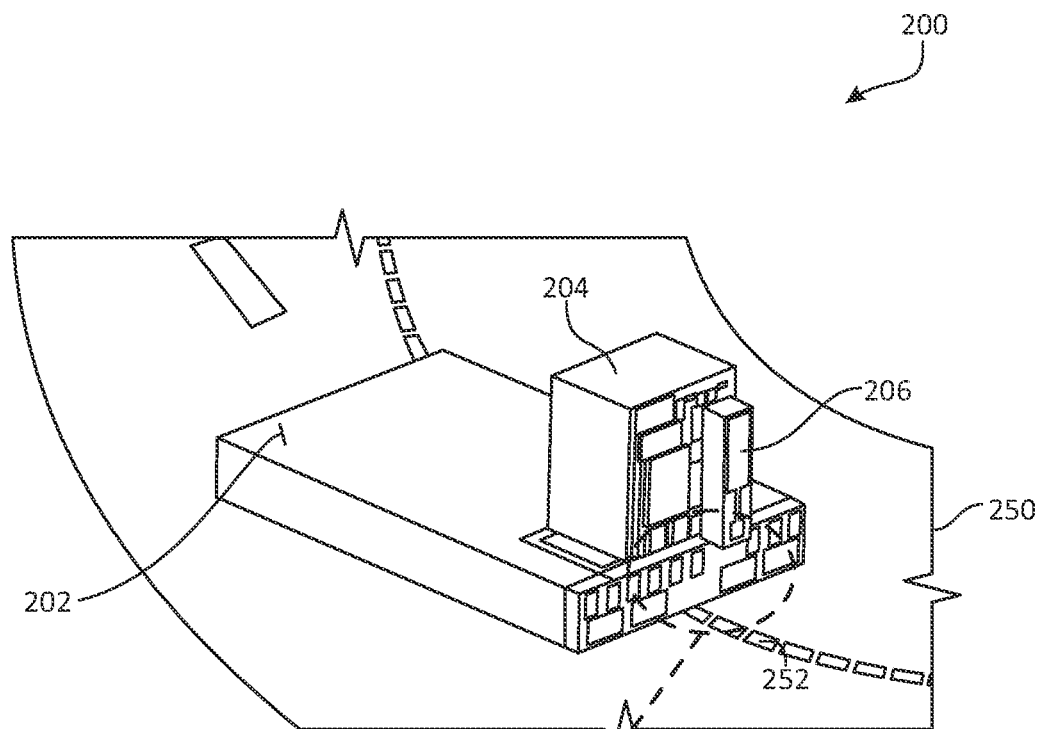
FIG. 2 is a schematic illustration of a HAMR system on which embodiments of the present disclosure may be practiced.
Figure 3:
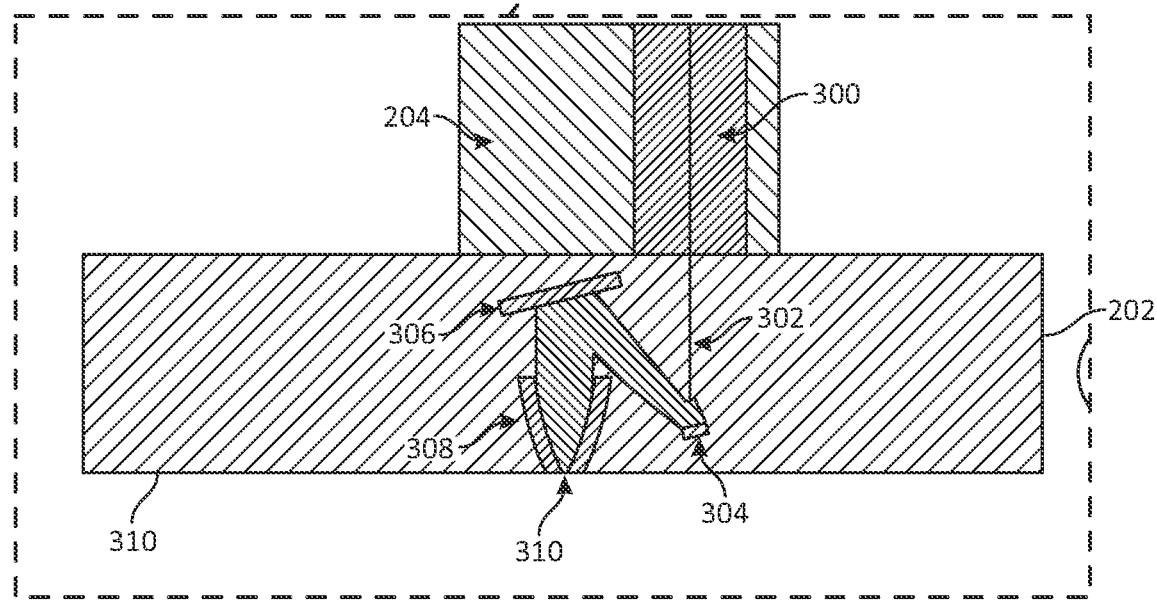
FIG. 3 is a close-up of a portion of the HAMR system of FIG. 2.

Referring to FIG. 2, basics of a HAMR system 200 are shown. HAMR system 200 includes a slider 202 on which a submount 204 is mounted. A laser 206 (e.g., a laser diode or the like) is mounted to the submount 204. The laser 206 heats a small spot on HAMR media 250 along a HAMR track 252. FIG. 3 illustrates a close-up view of a portion of the HAMR system 300 of FIG. 2. Specifically, FIG. 3 shows submount 204 mounted on slider 202. The laser 206 is a laser diode 300 that emits a laser beam through coupler 302. This beam is bounced off turning mirrors 304 and 306 and is further focused by planar solid immersion mirror (PSIM) 308. The NFT 310 is at the surface 312 of slider 202. The system 200, as shown, is a laser on slider system. That is, the laser is mounted on the submount. A laser in slider system is also amenable to use with the embodiments of the present disclosure.

The submount 204 includes signal routing back to a connector for a printed circuit cable (PCC). The PCC connects between the head and control electronics for the HDD. With multiple heads, for example, ten heads each having two sliders, that is 20 traces in what is a small area of the PCC. For the addition of extra NFTs to a traditional HAMR head, the number of traces would double to 40 for two NFTs per slider. In contrast, for an elevator drive with HAMR, the number of heads is reduced to two heads with two sliders. Even with multiple NFTs on a single slider, there is enough space on the PCC for all the traces.

Figure 4:
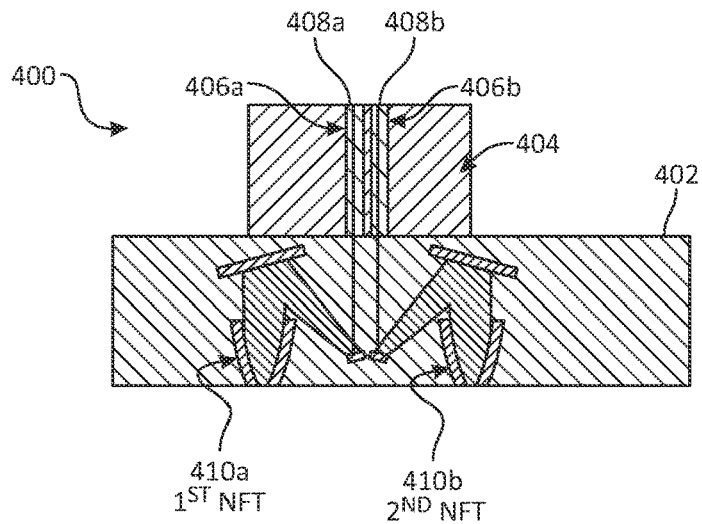
FIG. 4 is a section view of a slider and submount according to an embodiment of the present disclosure.

FIG. 4 illustrates an embodiment of a multiple NFT system 400 in accordance with an embodiment of the present disclosure. NFT system 400 is a laser on slider system, in which the laser source is mounted to the slider on a submount as described below. Multiple NFT system 400 comprises, in this embodiment, a slider 402 with a single submount 404. Submount 404 contains two laser sources 406a and 406b (e.g., laser diodes), each with its own coupler 408a, 408b, respectively. Laser source 406a feeds first NFT 410a. Laser source 406b feeds second NFT 410b. Each NFT 410a, 410b, works with multiple writers, but the laser sources 406a and 406b share the same submount 404. Each set of the NFT and writer works separately. The NFT-writer pairs may be switched during operation, which is similar to current head-switching in conventional HAMR drives.

Figure 5:
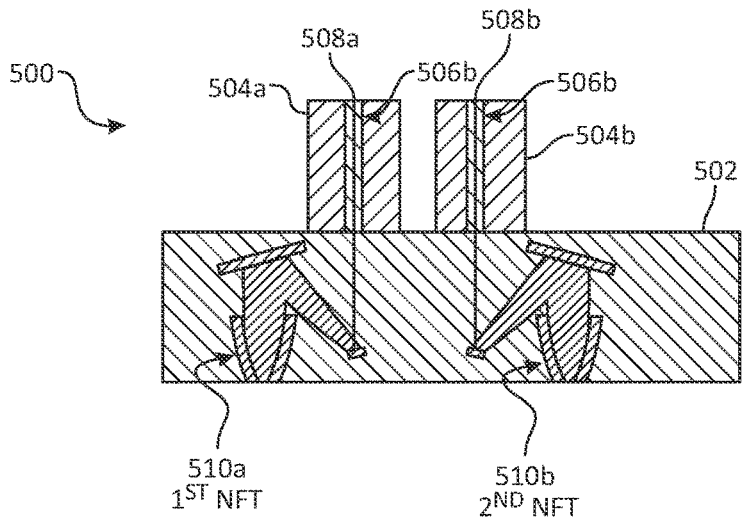
FIG. 5 is a section view of a slider and submounts according to another embodiment of the present disclosure.

FIG. 5 illustrates an embodiment of a multiple NFT system 500 in accordance with an embodiment of the present disclosure. NFT system 500 is also a laser on slider system. However, FIG. 5 shows a multiple NFT system 500 that comprises a slider 402 with dual submounts 504a and 504b, each mounted to slider 502. Submount 504a contains a laser source 506a (e.g., a laser diode) and a coupler 508a, and feeds first NFT 510a. Submount 504b contains a laser source 506b (e.g., a laser diode) and a coupler 508b, and feeds second NFT 510b.

In FIG. 5, each NFT 510a, 510b, is able to work with a single writer, or with multiple writers. The laser sources 506a and 506b have separate submounts 504a and 504b. Each set of the NFT and writer works separately, even with a single writer system. The NFT-writer pairs may be switched during operation, which is similar to current head-switching in conventional HAMR drives. Basics of a single writer system and a dual writer system are described below with respect to FIGS. 7 and 8.

While two NFTs are shown in FIGS. 4 and 5, it should be understood that more NFTs could be provided. Additional NFTs increase the lifespan of the NFT systems 400 and 500. For example, while additional NFTs could be provided in sliders (e.g., 402 and 502), with even three NFTs, the expected lifespan of the NFTs will exceed the expected lifespan of the rest of an HDD employing the multiple NFT configuration.

Figure 6:
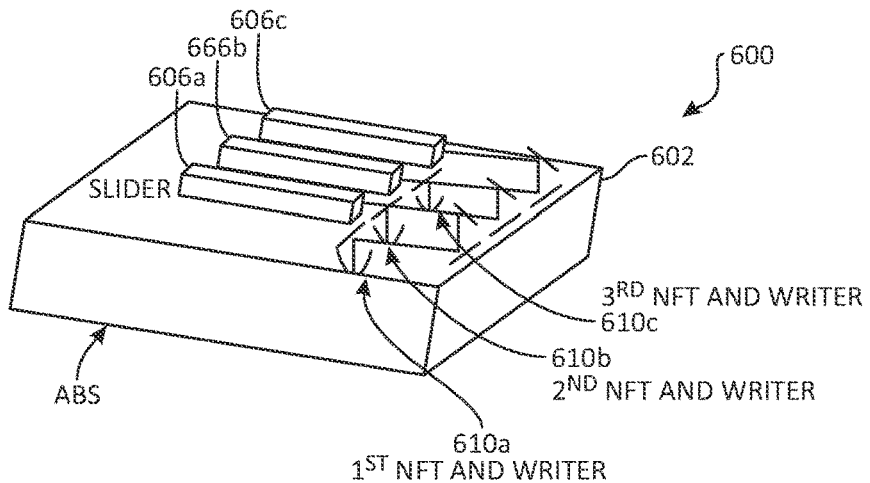
FIG. 6 is an illustration showing a laser in a slider embodiment of the present disclosure.

A basic laser in slider (LIS) system 600 is shown in FIG. 6. Details of the LIS system are not discussed, but it should be understood that multiple NFTs 610a, 610b, and 610c such as those described above may be formed within slider 602. The NFTs 610a, 610b, and 610c are fed, respectively, by "in slider" laser sources 606a, 606b, and 606c. For the LIS design of FIG. 6, multiple sets of laser sources are used. Since all the laser sources and writers are parallel to each other, there is no increase in the number of process steps for forming the LIS system 600.

Cost savings may also be obtained with the multiple NFT systems described herein. The reasons for this include:

(1) The cost of laser diode units in mass production is targeted to be on the order of $0.50 or less.

(2) Sharing components/materials of the dual-NFT design further reduces the cost. Examples of shared components include, for example, power monitors and submounts.

(3) Insignificant wafer process cost due to the parallel NFT alignment.

The reason for the wPOH gains for multiple NFTs is that, the probability that each of the NFTs on a given head are low wPOH outliers is much lower than the probability that a single NFT is. With a single NFT system, the planned lifespan is usually determined at a worst case scenario for NFT life. With two NFTs, even if each is a low life outlier, the expected lifespan increases by a factor of two. However, as discussed above, dual NFT sliders, or sliders with three NFTs, increase the expected lifespan of the NFT systems 400, 500, 600. For example, for a dual-NFTs design, the wPOH gain is approximately 10× in drive-level if the Weibull parameter β is 2. The wPOH gain will grow to approximately 60× when f3 degrades. The calculations of such are well within the scope of those of skill in the art, and are not detailed further herein. If three NFTs are used, the wPOH gain would be more than that required in order to cover all the cases and workload in known elevator drives operations.

Operation of the multiple NFT embodiments of the present disclosure may vary. That is, the NFTs may be used serially. In a serial use, the first NFT (e.g., 410a, 510a, 610a) is used until it either fails, its operation degrades to below a certain efficiency, or it nears its expected lifetime given the number of cycles it has gone through, workload time, or the like. When the chosen criteria for switching is reached, operations on the first NFT are switched to operations on the second NFT.

Alternatively, operation may be load-factored between the multiple NFTs. That is, after a certain amount of time, or workload, has been performed on the first NFT, operation is switched to the second NFT or the third NFT. In this way, overheating of the NFTs, which is a factor in NFT degradation, may be controlled somewhat.

The single submount design of FIG. 4 and the dual submount design of FIG. 5 operate in the same way. Separate submounts may have a slightly higher initial cost, due to additional components such as additional pads, traces and the like. However, manufacture is still straightforward, and correction for failure of a single submount of a dual (or triple) submount system may be effected by replacement of the individual failed submount. Sliders, in this way, may be essentially plug and play devices for swapping of individual submounts. The multiple NFT systems fit onto a slider since there is enough room thereon for increasing numbers of increasingly smaller submounts.

In one embodiment, a slider may be pre-fabricated with, for example, three NFTs each having a location for mounting up to three individual submounts in a plug and play fashion. That way, failing submounts could be replaced individually.

Figure 7:
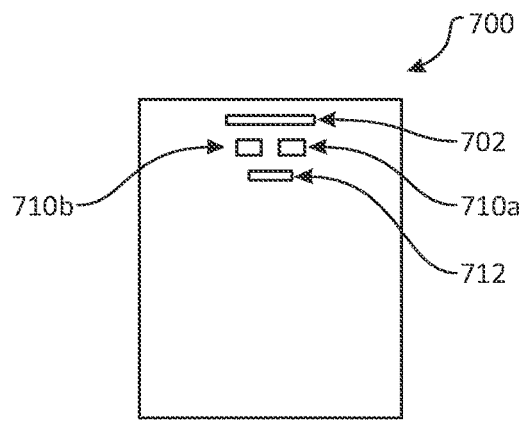
FIG. 7 is an illustration showing a single writer dual NFT design according to an embodiment of the present disclosure.
Figure 8:
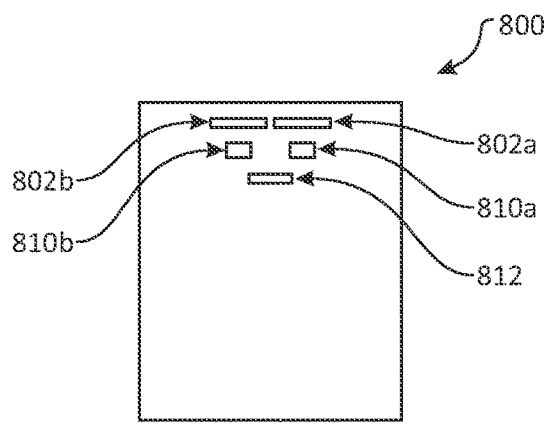
FIG. 8 is an illustration showing a dual writer dual NFT design according to an embodiment of the present disclosure.

The two (or more) NFTs of the systems 400, 500, 600 may use a single writer (as shown in FIG. 7) or two writers (as shown in FIG. 8). FIGS. 7 and 8 are shown with two NFTs, but it should be understood that three or more NFTs may be used with the configurations of FIGS. 7 and 8 without departing from the scope of the disclosure.

FIG. 7 shows a single writer dual NFT design 700. In FIG. 7, writer 702 is used for first NFT 710*a* and second NFT 710*b*. A reader 712 is used for each NFT. In FIG. 8, writers 802*a* and 802*b* are used for first NFT 810*a* and second NFT 810*b*. A reader 812 is used for each NFT. While readers generally have no functional relationship with NFTs, for dual or multi-NFT designs, HDDs calibrate the track offset between the writing position (determined by both writer location/size and NFT location/hotspot location/size) and reading position for each NFT. The offset is a function of track radius. Offset calibration is carried out in HDD certification processes, and the data are stored in the media system zone. Each NFT has a set of the offset calibration data.

In each of designs 700 and 800, the tracks per inch (TPI) is determined by a spot size of the NFT hot spot on the media. For the case of single writer 702 of FIG. 7, the writer geometry is designed to be large, so the write magnetic field can overshadow the hot spot of each of the NFTs 710*a* and 710*b*. For the case of dual writers 802*a* and 802*b* of FIG. 8, each writer is associated with a dedicated NFT. For both the single writer or dual writer designs, only one NFT works at a time. NFTs may be switched regularly.

Figure 9:
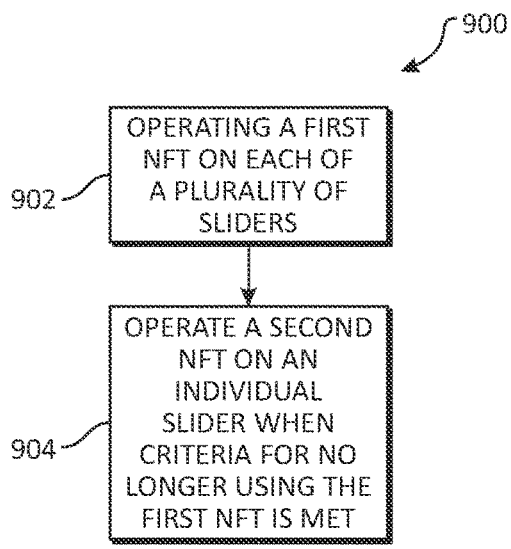
FIG. 9 is a flow chart diagram of a method according to an embodiment of the present disclosure.

A method 900 of operating a data storage device having heads for HAMR is shown in flow chart form in FIG. 9. The method 900 comprises, in one embodiment, operating a first NFT of a plurality of NFTs on each of a plurality of sliders for reading and/or writing data to the data storage device in block 902. A second NFT of the plurality of NFTs on an individual slider is operated in block 904 when one of the criteria for no longer using the first NFT is met. The criteria, as has been discussed herein, includes a predetermined degradation of operation of the first NFT, failure of the first NFT, a predetermined temperature of the first NFT, or the like.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A recording system for a heat assisted magnetic recording hard disc drive (HDD), comprising:
   a head suspension pair including a first head/slider facing a first direction, and a second head/slider facing an opposite direction from the first head/slider; and
   a plurality of near field transducers (NFTs) on each of the first head/slider and the second head/slider.

2. The recording system of claim 1, wherein each of the plurality of NFTs is configured to operate with multiple writers.

3. The recording system of claim 1, wherein each plurality of NFTs comprises two NFTs.

4. The recording system of claim 1, wherein each plurality of NFTs comprises three NFTs.

5. The recording system of claim 3, wherein the plurality of NFTs is mounted on a single submount.

6. The recording system of claim 3, wherein each of the plurality of NFTs is mounted on its own individual submount.

7. The recording system of claim 1, wherein each of the plurality of NFTs comprises a laser source and the laser sources are mounted on a single submount.

8. The recording system of claim 1, wherein each of the plurality of NFTs comprises a laser source and each laser source is mounted on its own individual submount.

9. The recording system of claim 1, wherein the head suspension pair is mounted in an elevator style HDD.

10. A data storage device comprising:
a plurality of heat assisted magnetic recording (HAMR) data storage media;
a head stack assembly (HSA) including HAMR heads for reading data from and/or writing data to the data storage media; and
an elevator system for moving the HSA to engage the data storage media;
each HSA comprising:
a head suspension pair including a first head/slider facing a first direction, and a second head/slider facing an opposite direction from the first head/slider to engage top and bottom surfaces of data storage media; and
a plurality of near field transducers (NFTs) on each of the first head/slider and the second head/slider.

11. The data storage device of claim 10, wherein each of the plurality of NFTs is configured to operate with multiple writers.

12. The data storage device of claim 10, wherein each plurality of NFTs comprises two NFTs.

13. The data storage device of claim 12, wherein each of the plurality of NFTs is mounted on a single submount.

14. The data storage device of claim 12, wherein each of the plurality of NFTs is mounted on its own individual submount.

15. The data storage device of claim 10, wherein each of the plurality of NFTs comprises a laser source and the laser sources are mounted on a single submount.

16. The data storage device of claim 10, wherein each of the plurality of NFTs comprises a laser source and each laser source is mounted on its own individual submount.

17. A method of operating a data storage device having heads for heat assisted magnetic recording, the method comprising:
operating a first near field transducer (NFT) of a plurality of NFTs on each of a plurality of sliders for reading and/or writing data to the data storage device; and
operating a second NFT of the plurality of NFTs on an individual slider of the plurality of sliders when a criterion for no longer using the first NFT is met.

18. The method of claim 17, wherein the criterion is a predetermined degradation of operation of the first NFT.

19. The method of claim 17, wherein the criterion is failure of the first NFT.

20. The method of claim 17, wherein the criterion is a predetermined temperature of the first NFT.

* * * * *